United States Patent
Hu et al.

(10) Patent No.: US 12,383,820 B2
(45) Date of Patent: Aug. 12, 2025

(54) METHOD FOR CONTROLLING GAME DISPLAY, NON-TRANSITORY COMPUTER-READABLE STORAGE MEDIUM AND ELECTRONIC DEVICE

(71) Applicant: NETEASE (HANGZHOU) NETWORK CO., LTD., Zhejiang (CN)

(72) Inventors: Shihan Hu, Zhejiang (CN); Yiming Feng, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 80 days.

(21) Appl. No.: 18/252,197

(22) PCT Filed: Dec. 2, 2021

(86) PCT No.: PCT/CN2021/135166
§ 371 (c)(1),
(2) Date: May 9, 2023

(87) PCT Pub. No.: WO2022/247204
PCT Pub. Date: Dec. 1, 2022

(65) Prior Publication Data
US 2023/0405452 A1 Dec. 21, 2023

(30) Foreign Application Priority Data
May 25, 2021 (CN) .......................... 202110574121.7

(51) Int. Cl.
*A63F 13/21* (2014.01)
*A63F 13/2145* (2014.01)
(Continued)

(52) U.S. Cl.
CPC ........ *A63F 13/2145* (2014.09); *A63F 13/525* (2014.09); *A63F 13/533* (2014.09)

(58) Field of Classification Search
CPC ........ A63F 13/20; A63F 13/213; A63F 13/40; A63F 13/42; A63F 13/426; A63F 13/45;
(Continued)

(56) References Cited

U.S. PATENT DOCUMENTS 9,662,564 B1 * 5/2017 Hensel .................... A63F 13/35
2006/0094503 A1 5/2006 Ajioka et al.
(Continued)

FOREIGN PATENT DOCUMENTS

| CN | 107122099 A | 9/2017 |
| CN | 108465240 A | 8/2018 |

(Continued)

OTHER PUBLICATIONS

1st Office Action dated Jan. 31, 2024 for Chinese Application No. 202110574121.7.
(Continued)

*Primary Examiner* — Omkar A Deodhar
(74) *Attorney, Agent, or Firm* — Qinghong Xu

(57) ABSTRACT

A method for controlling game display includes: providing an attachment point on the target virtual three-dimensional model; in response to a first touch operation on the graphical user interface, adjusting a default viewing angle for shooting the three-dimensional game scene with the virtual camera to a current viewing angle, and updating a first coordinate of the attachment point in a camera space of the virtual camera; determining a second coordinate of the attachment point in a screen space according to the updated first coordinate of the attachment point in the camera space; determining an anchor point coordinate in the screen space of an anchor point of a two-dimensional UI control associated with the (Continued)

target virtual three-dimensional model according to the second coordinate of the attachment point in the screen space; and displaying the two-dimensional UI control in the graphical user interface according to the anchor point coordinate.

20 Claims, 5 Drawing Sheets

(51) Int. Cl.
*A63F 13/525* (2014.01)
*A63F 13/533* (2014.01)

(58) Field of Classification Search
CPC ........ A63F 13/50; A63F 13/52; A63F 13/533; A63F 13/525; A63F 13/5252; A63F 13/55; A63F 13/57; A63F 13/67; A63F 13/70
See application file for complete search history.

(56) References Cited

U.S. PATENT DOCUMENTS

| | | | |
|---|---|---|---|
| 2012/0077582 A1* | 3/2012 | Noge | A63F 13/53 463/43 |
| 2019/0060767 A1 | 2/2019 | Shao | |
| 2021/0052984 A1* | 2/2021 | Kurabayashi | A63F 13/92 |
| 2021/0213357 A1* | 7/2021 | Morishita | A63F 13/5252 |
| 2021/0260472 A1* | 8/2021 | Fukushima | A63F 13/53 |

FOREIGN PATENT DOCUMENTS

| | | |
|---|---|---|
| CN | 110124310 A | 8/2019 |
| CN | 111729306 A | 10/2020 |
| CN | 112230836 A | 1/2021 |
| CN | 113318428 A | 8/2021 |

OTHER PUBLICATIONS

International Search Report dated Mar. 1, 2022 of International Application No. PCT/CN2021/135166.

* cited by examiner

METHOD FOR CONTROLLING GAME DISPLAY, NON-TRANSITORY COMPUTER-READABLE STORAGE MEDIUM AND ELECTRONIC DEVICE

CROSS REFERENCE TO RELATED APPLICATIONS

The present application is a National Stage Application of International Application No. PCT/CN2021/135166, filed on Dec. 2, 2021, which is based upon and claims priority to Chinese Patent Application No. 202110574121.7 entitled "Method for controlling game display, non-volatile storage medium and electronic device", filed on May 25, 2021, the entire contents of both of which are incorporated herein by reference for all purposes.

TECHNICAL FIELD

The present disclosure relates to the field of computers, and in particular, to a method for controlling game display, a non-transitory storage medium, and an electronic device.

BACKGROUND

Currently, the two-dimensional (2D) user interface (UI) controls provided in the related art usually display 2D pictures according to a specific level, and usually do not have a three-dimensional (3D) stereoscopic effect, and the virtual camera used is an orthogonal camera.

SUMMARY

According to an aspect of the present disclosure, there is provided a method for controlling game display, including:
providing, by an electronic device comprising a graphical user interface, an attachment point on a target virtual three-dimensional model in a game scene image, where content displayed on the graphical user interface includes the game scene image obtained by shooting a three-dimensional game scene with a virtual camera, and the game scene image includes the target virtual three-dimensional model; adjusting, in response to a first touch operation on the graphical user interface, a default viewing angle for shooting the three-dimensional game scene with the virtual camera to a current viewing angle, and updating a first coordinate of the attachment point in a camera space of the virtual camera; determining a second coordinate of the attachment point in a screen space according to the first coordinate of the attachment point in the camera space; determining an anchor point coordinate in the screen space of an anchor point of a two-dimensional UI control associated with the target virtual three-dimensional model according to the second coordinate of the attachment point in the screen space; and displaying the two-dimensional UI control in the graphical user interface according to the anchor point coordinate.

According to an aspect of the present disclosure, there is provided a non-transitory computer-readable storage medium, a computer program stored in the storage medium, where the computer program is configured to, when run, execute the method for controlling game display according to the above aspect.

According to an aspect of the present disclosure, there is provided an electronic device including a memory and a processor, where a computer program is stored in the memory, and the processor is configured to run the computer program to execute the method for controlling game display according to the above aspect.

BRIEF DESCRIPTION OF THE DRAWINGS

The accompanying drawings described here are used to provide a further understanding of the present disclosure and constitute a part of the present disclosure. The exemplary embodiments of the present disclosure and their descriptions are used to explain the present disclosure and do not constitute an improper limitation of the present disclosure. In the accompanying drawings.

DETAILED DESCRIPTION

In order to make those skilled in the art better understand the solutions of the present disclosure, the technical solutions in the embodiments of the present disclosure will be clearly and completely described below with reference to the accompanying drawings in the embodiments of the present disclosure. Obviously, the described embodiments are part embodiments of the present disclosure, but not all of the embodiments. Based on the embodiments in the present disclosure, all other embodiments obtained by those of ordinary skill in the art without creative efforts shall fall within the protection scope of the present disclosure.

It should be noted that the terms "first", "second" and the like in the description and claims and the above drawings of the present disclosure are used to distinguish similar objects, and are not necessarily used to describe a specific sequence or sequence. It is to be understood that the data so used may be interchanged under appropriate circumstances such that the embodiments of the disclosure described here can be practiced in sequences other than those illustrated or described here. Furthermore, the terms "comprise" and "include" and any variations of them, are intended to cover non-exclusive inclusion, for example, a process, method, system, product or device including a series of steps or units is not necessarily limited to those expressly listed steps or units, rather may include other steps or units not expressly listed or inherent to these processes, methods, products or devices.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Figure 1:
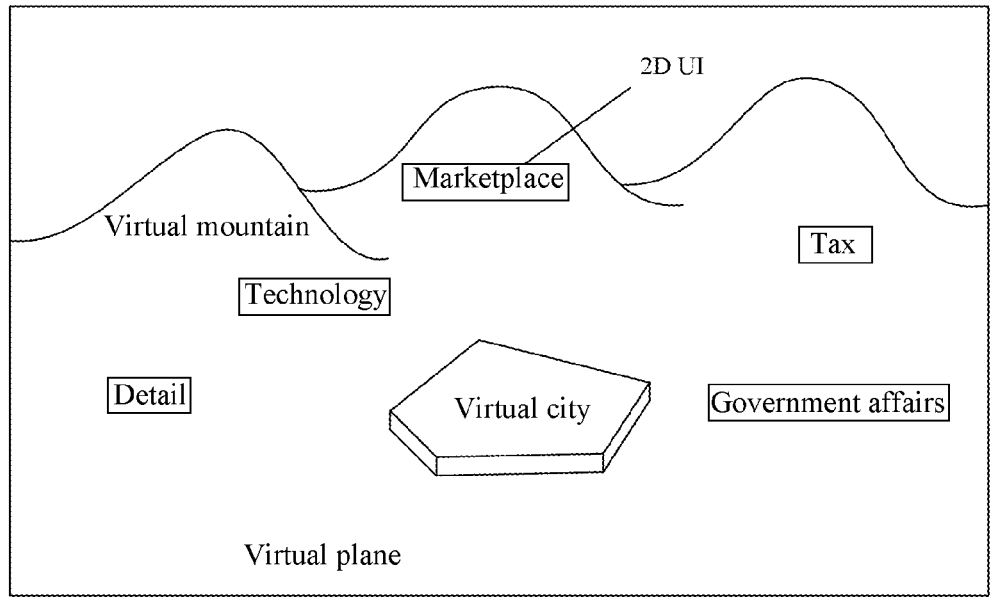
FIG. 1 is a schematic diagram of 2D UI controls in a game scene according to the related art.
Figure 2:
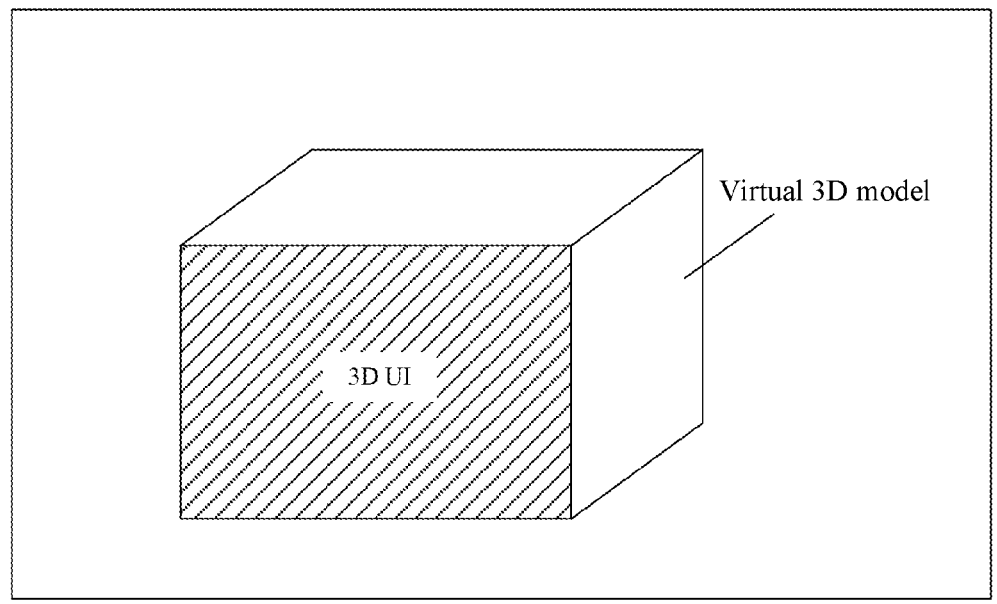
FIG. 2 is a schematic diagram of a 3D UI control in a game scene according to the related art.

FIG. 1 is a schematic diagram of 2D UI controls in a game scene according to a related art. As shown in FIG. 1, 2D UI controls are combined with a background image in a graphical user interface of a strategy game, for example: 2D UI Control for "Tax", 2D UI control for "Government affairs", 2D UI control for "Marketplace", 2D UI control for "Technology", 2D UI control for "Detail", etc. Since the viewing angle of the background image is fixed, the viewing angle of the 2D UI controls is also relatively fixed. Unlike 2D UI controls, 3D UI controls are usually created in a three-dimensional space, and the virtual camera used by them is a perspective camera. FIG. 2 is a schematic diagram of a 3D UI control in a game scene according to the related art. As shown in FIG. 2, a virtual 3D model (for example, a virtual 3D building such as an apartment, an office building, a shopping mall, etc.) is combined with a 3D UI control in the graphical user interface of a simulated city game, which can configure the 3D UI control as the patch of the 3D model. When adjusting the viewing angle of the virtual camera to shoot the 3D game scene, the patch where the 3D UI control is located and the virtual 3D model move visually synchronously.

In the related art, the static interface effects used by 2D UI controls are less expressive and more rigid when combining a 2D UI controls with a background image, and the visual change can be detrimental to the backward compatibility of electronic products when combining a virtual 3D model with a 3D UI control.

According to some embodiments of the present disclosure, a method for controlling game display is provided. It should be noted that the steps shown in the flowchart of the accompanying drawings can be executed in a computer system such as a set of computer-executable instructions, and, although a logical order is shown in the flowcharts, in some cases the steps shown or described may be performed in an order different from the order here.

Figure 3:
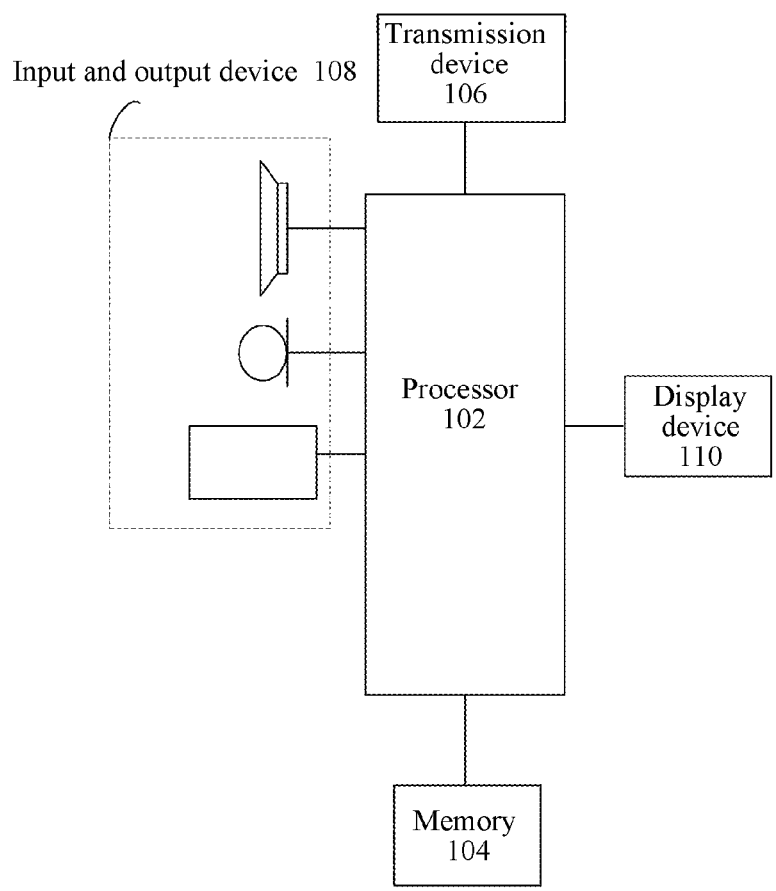
FIG. 3 is a block diagram of a hardware structure of a mobile terminal for a method for controlling game display according to an embodiment of the present disclosure.

The method embodiments may be executed in a mobile terminal, a computer terminal or a similar computing device. Taking running on a mobile terminal as an example, the mobile terminal can be a smart phone (such as an Android mobile phone, an iOS mobile phone, etc.), a tablet computer, a PDA, a mobile Internet device (referred to as MID), a PAD, and a game console, etc. FIG. 3 is a block diagram of the hardware structure of a mobile terminal for a method for controlling game display according to an embodiment of the present disclosure. As shown in FIG. 3, the mobile terminal may include one or more (one is shown in FIG. 3) processors 102 (the processor 102 may include, but is not limited to, a central processing unit (CPU), a graphics processing unit (GPU), a digital signal processing (DSP) chip, a micro-processing unit (MCU), a programmable gate array (FPGA), a neural network processing unit (NPU), a tensor processing unit (TPU), an artificial intelligence (AI) type processor, etc.) and memory 104 for storing data. In some embodiments, the above-mentioned mobile terminal may further include a transmission device 106 for communication functions, an input and output device 108 and a display device 110. Those skilled in the art can understand that the structure shown in FIG. 3 is for illustration, and it does not limit the structure of the above-mentioned mobile terminal. For example, the mobile terminal may further include more or less components than those shown in FIG. 3, or have a different configuration than that shown in FIG. 3.

The memory 104 can be used to store computer programs, for example, software programs and modules of application software, such as computer programs corresponding to the method for controlling game display in the embodiments of the present disclosure. The processor 102 executes various functional applications and data processing by running the computer programs stored in the memory 104, that is to implement the method for controlling game display described above. The memory 104 may include high-speed random access memory, and may also include non-volatile memory, such as one or more magnetic storage devices, flash memory, or other non-volatile solid-state memory. In some embodiments, the memory 104 may further include memory located remotely from the processor 102, and these remote memories may be connected to the mobile terminal through a network. Examples of such networks include, but are not limited to, the Internet, an intranet, a local area network, a mobile communication network, and combinations of them.

The transmission device 106 is used to receive or transmit data via a network. The specific example of the above-mentioned network may include a wireless network provided by a communication provider of the mobile terminal. In one example, the transmission device 106 includes a network interface adapter (referred to as NIC), which can be connected to other network devices through abase station so as to communicate with the Internet. In one example, the transmission device 106 may be a radio frequency (referred to as RF) module, which is used to communicate with the Internet in a wireless manner.

The input of the input and output device 108 may come from a plurality of human interface devices (referred to as HID), for example, a keyboard, a mouse, a gamepad, other specialized game controllers (e.g., a steering wheel, a fishing rod, a dancing mat, a remote control, etc.). In addition to providing input functions, some human interface devices can also provide output functions, such as force feedback and vibration of a gamepad, and audio output of a controller.

The display device 110 may be, for example, ahead-up display (HUD), a touch screen-style liquid crystal display (LCD), and a touch display (also referred to as a "touch screen" or "touch display"). The liquid crystal display may enable the user to interact with the user interface of the mobile terminal. In some embodiments, the above-mentioned mobile terminal has a graphical user interface (GUI), and the user can perform human-computer interaction with the GUI by touching finger contacts and/or gestures on the touch-sensitive surface, where the human-computer interaction function optionally includes the following interactions: creating a web page, drawing, word processing, making an electronic document, gaming, a video conferencing, instant messaging, sending and receiving an e-mail, calling interface, playing digital video, playing digital music and/or web browsing, etc. Executable instructions for performing the above human-computer interaction functions are configured/stored in one or more processor-executable computer program products or readable storage medium.

Figure 4:
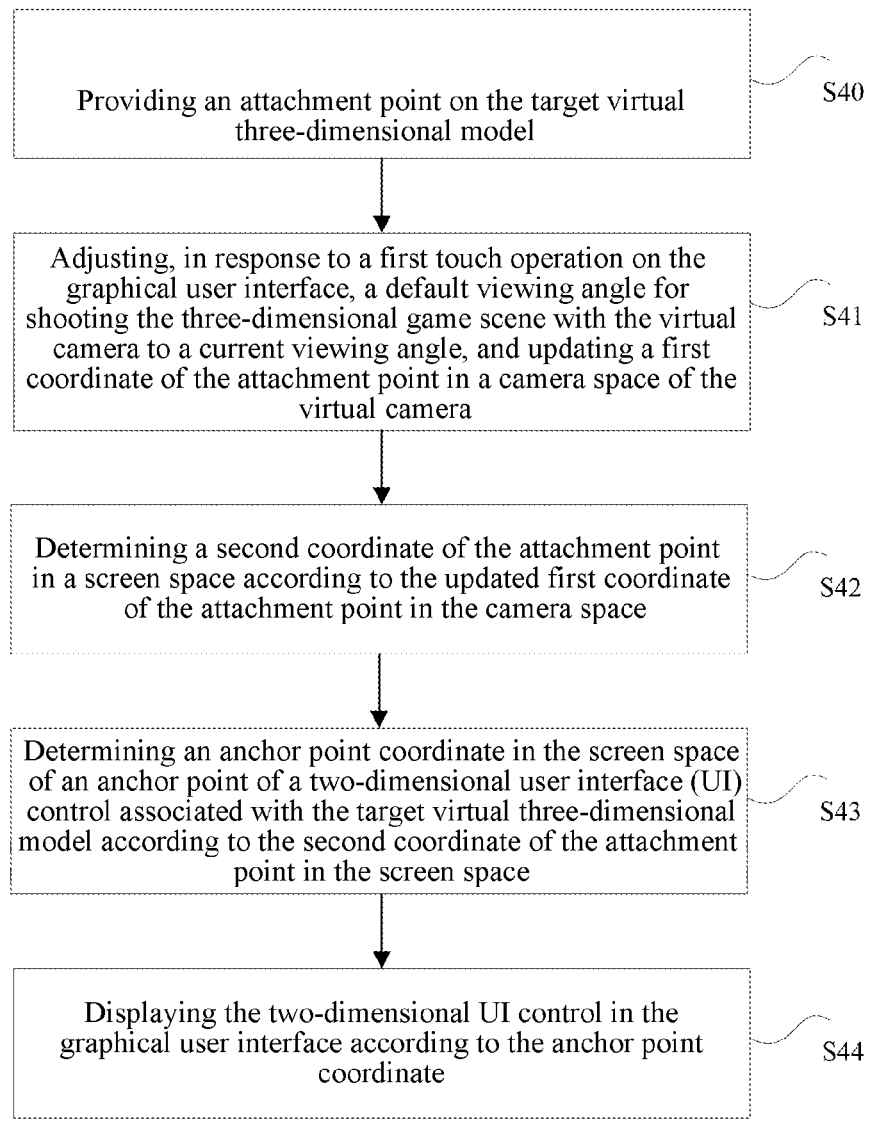
FIG. 4 is a flowchart of a method for controlling game display according to an embodiment of the present disclosure.

In the embodiments, a method for controlling game display running on the above-mentioned mobile terminal is provided. A graphical user interface is provided by an electronic device, and the content displayed on the graphical user interface includes a game scene image obtained by shooting a three-dimensional game scene with a virtual camera, where the game scene image includes a target virtual three-dimensional model. FIG. 4 is a flowchart of a method for controlling game display according to one embodiment of the present disclosure. As shown in FIG. 4, the method includes the following steps:

In step S40, an attachment point is provided on the target virtual three-dimensional model.

The above-mentioned target virtual three-dimensional models may include but are not limited to: a virtual three-dimensional building model (for example: a virtual main city model, a virtual apartment model, a virtual office building model, etc.), a virtual three-dimensional vehicle model (for example: a virtual vehicle model, a virtual aircraft model), a virtual three-dimensional natural resource model (for example: a virtual three-dimensional mountain model, a virtual three-dimensional jungle model, etc.). The above-mentioned attachment point is used to provide a reference position for attaching a 2D UI control on the target virtual three-dimensional model.

In step S41, in response to a first touch operation on the graphical user interface, a default viewing angle for shooting the three-dimensional game scene with the virtual camera is adjusted to a current viewing angle, and a first coordinate of the attachment point in the camera space of the virtual camera is updated.

The above-mentioned first touch operation may include, but is not limited to, a sliding (dragging) operation, a re-pressing operation, and a long-pressing operation. Taking the first touch operation as a sliding (dragging) operation as an example, the virtual camera can usually determine the viewing angle used for rendering the game scene. By performing a swipe (dragging) operation on the graphical user interface, the default viewing angle for shooting the three-dimensional game scene with the virtual camera can be adjusted to the current viewing angle. This default viewing angle corresponds to the starting position of the sliding (dragging) operation. The current viewing angle corresponds to the end position of the sliding (dragging) operation.

The camera space is a three-dimensional space. In the camera space, the virtual camera is usually located at the origin of the camera space, and the choice of its coordinate axis can be arbitrary. For example: the +x axis points to the right of the virtual camera, the +y axis points to the top of the virtual camera, and the +z axis points to the back of the virtual camera. Under the default viewing angle of the virtual camera shooting the three-dimensional game scene, the representation of the three coordinate axes of the camera space in the world space can be calculated, and then a transformation matrix from the camera space to the world space can be constructed, and then a transformation matrix from the world space to the camera space can be obtained by inverting the transformation matrix from the camera space to the world space, thereby determining the first coordinate of the attachment point in the camera space of the virtual camera. In the same way, under the current perspective of the virtual camera shooting the three-dimensional game scene, the representation of the three coordinate axes of the camera space in the world space can also be calculated, and then a transformation matrix from the camera space to the world space is constructed, and then a transformation matrix from the world space to the camera space can be obtained by inverting the transformation matrix from the camera space to the world space, thereby updating the first coordinate of the attachment point in the camera space of the virtual camera.

In step S42, according to the updated first coordinate of the attachment point in the camera space, a second coordinate of the attachment point in the screen space is determined.

The screen space is a two-dimensional space. The updated first coordinate of the attachment point in the camera space can be transformed from the camera space to a clip space by using a projection matrix, and then the first coordinate is projected from the clip space to the screen space to generate a corresponding 2D coordinate, that is, the second coordinate of the attachment point in the screen space.

In step S43, according to the second coordinate of the attachment point in the screen space, an anchor point coordinate in the screen space of an anchor point of a two-dimensional UI control associated with the target virtual three-dimensional model is determined.

The above anchor point coordinate may be any vertex coordinate or center coordinate of the two-dimensional UI control. For example, when the shape of the two-dimensional UI control is a pentagon, the anchor point of the two-dimensional UI control can be either any vertex of the pentagon, or the center point of the pentagon. The anchor point coordinate can be either the coordinate of any vertex of the pentagon, or the center coordinate of the pentagon. After the second coordinate of the attachment point in the screen space are determined, the anchor point coordinate in the screen space of the anchor point of the two-dimensional UI control may be determined based on the second coordinate. The position of the anchor point coordinates may be coincident with the position of the second coordinate, or there may be a certain offset from the position of the second coordinate.

The above-mentioned two-dimensional UI control is a two-dimensional map generated based on a preset two-dimensional UI template. The preset two-dimensional UI template can be pre-configured in a two-dimensional UI editor, and the preset two-dimensional UI template is used to determine styles of the two-dimensional UI control, for example: the outline of the 2D UI control, the color of the 2D UI control, the transparency of the 2D UI control, etc. The display content of the two-dimensional UI control may include, but is not limited to, at least one of the following: a picture identification, and a text identification. For example, when the two-dimensional UI control is a barracks UI control associated with a virtual main city model, the display content of the barracks UI control may include a soldier picture and a barracks text.

In step S44, the two-dimensional UI control is displayed in the graphical user interface according to the anchor point coordinate.

Compared with the processing method of combining a 2D UI control with the background image, the processing method of combining a 2D UI control and a virtual 3D model can significantly enhance the expressiveness of interface effects. Compared with the processing method of combining a 3D UI control and a virtual 3D model, it does not require to take the UI control as part of the 3D model. The system power consumption for a 2D UI control (which is essentially a 2D map) will be significantly lower than the system power consumption for a 3D UI control (which is essentially a 3D model), thereby improving the backward compatibility of electronic products.

Through the above steps, the following method can be adopted: providing an attachment point on the target virtual three-dimensional model; in response to a first touch operation on the graphical user interface, adjusting a default viewing angle for shooting the three-dimensional game scene with the virtual camera to a current viewing angle and updating a first coordinate of the attachment point in a camera space of the virtual camera; determining a second coordinate of the attachment point in a screen space according to the updated first coordinate of the attachment point in the camera space; determining an anchor point coordinate in the screen space of an anchor point of a two-dimensional UI control associated with the target virtual three-dimensional model according to the second coordinate of the attachment point in the screen space; and displaying the two-dimensional UI control in the graphical user interface according to the anchor point coordinate, so as to simulate the effect of a 3D UI control using a 2D UI control in the virtual 3D model in the game scene, so that when adjusting the viewing angle of the virtual camera to shoot the three-dimensional game scene, the 2D UI control can visually follow the movement, thus realizing the technique effects of reducing the system power consumption effectively and enhancing the game screen expressiveness on the premise of ensuring the operating efficiency of the electronic device, furthermore solving the technical problem of lack of interface effect expressiveness in the processing method of combining the 2D UI control with the background image provided in the related art, and the technical problem of increasing the system power consumption of the mobile terminal in the processing method of combing the virtual 3D model with the 3D UI control.

In some embodiments, in step S41, in response to the first touch operation on the graphical user interface, adjusting the default viewing angle for shooting the three-dimensional game scene with the virtual camera to the current viewing angle may include the following execution steps:

In step S410, in response to the first touch operation on the graphical user interface, a default viewing angle for shooting the target virtual three-dimensional model with the virtual camera is adjusted to the current viewing angle.

In some embodiments, the virtual camera may determine the viewing angle used to render the target virtual three-dimensional model. By performing a sliding (dragging) operation on the graphical user interface, the default viewing angle for shooting the target virtual three-dimensional model with the virtual camera can be adjusted to the current viewing angle. The default viewing angle corresponds to the starting position of the sliding (dragging) operation. The current viewing angle corresponds to the end position of the sliding (dragging) operation.

In addition, in order to ensure the normal display of the 2D UI control in the graphical user interface, a viewing angle variation range is to be set for the virtual camera, so that the default viewing angle for shooting the three-dimensional game scene with the virtual camera is adjusted to the current viewing angle within the viewing angle variation range of the virtual camera. The viewing angle variation range is used to define an upper limit value of viewing angle variation and a lower limit value of viewing angle variation value of the current viewing angle relative to the default viewing angle. For example: when the viewing angle variation range is 0-120 degrees, the angle formed between the viewing direction under the current viewing angle and the viewing direction under the default viewing angle cannot exceed 120 degrees, otherwise the two-dimensional UI control will be displayed abnormally.

In some embodiments, the above method for controlling game display may further include the following execution steps:

In step S45, in response to a second touch operation on the graphical user interface, a first image content obtained by shooting the three-dimensional game scene with the virtual camera is adjusted to a second image content;

In step S46, when the second image content includes the target virtual three-dimensional model, in response to a third touch operation on the target virtual three-dimensional model, the default viewing angle for shooting the target virtual three-dimensional model with the virtual camera is determined.

The above-mentioned second touch operation may include, but is not limited to, a sliding (dragging) operation, a re-pressing operation, and a long-pressing operation. By performing a sliding (dragging) operation on the graphical user interface, the first image content obtained by shooting the three-dimensional game scene with the virtual camera can be adjusted to the second image content, and in the process of adjusting the first image content to the second image content, the viewing angle of the virtual camera for shooting the game scene image remains unchanged. For example, by performing a sliding (dragging) operation on the graphical user interface, the position of the virtual main city model created by game players of one party in the game map can be displayed in the first image content, or natural resources such as minerals, trees etc., searched by game players of another party for the development of the virtual main city model can be displayed in the first image content. That is, the above-mentioned target virtual three-dimensional model is usually not included in the first image content. The second image content is the image content including the target virtual three-dimensional model returned from the virtual three-dimensional model other than the above target virtual three-dimensional model in the displayed game scene.

The above-mentioned third touch operation may include, but is not limited to, a click operation, a re-pressing operation, and a long-pressing operation. When the second image content includes the target virtual three-dimensional model, by performing a click operation on the target virtual three-dimensional model, the default viewing angle for shooting the target virtual three-dimensional model with the virtual camera can be determined. Under the default viewing angle for shooting the target virtual three-dimensional model with the virtual camera, the 2D UI control will be displayed in the graphical user interface according to the anchor point coordinates of the anchor point of the 2D UI control in the screen space.

In some embodiments, in response to the second touch operation, both the first image content and the second image content are displayed with a first scale (e.g., a scale of 1:800). The game scene image obtained by shooting the three-dimensional game scene with the virtual camera at the default viewing angle in response to the third touch operation, and the game scene image obtained by shooting the three-dimensional game scene with the virtual camera at the current viewing angle in response to the first touch operation, will be displayed with a second scale (for example, a scale of 1:100). That is, the second scale is larger than the first scale.

Figure 5:
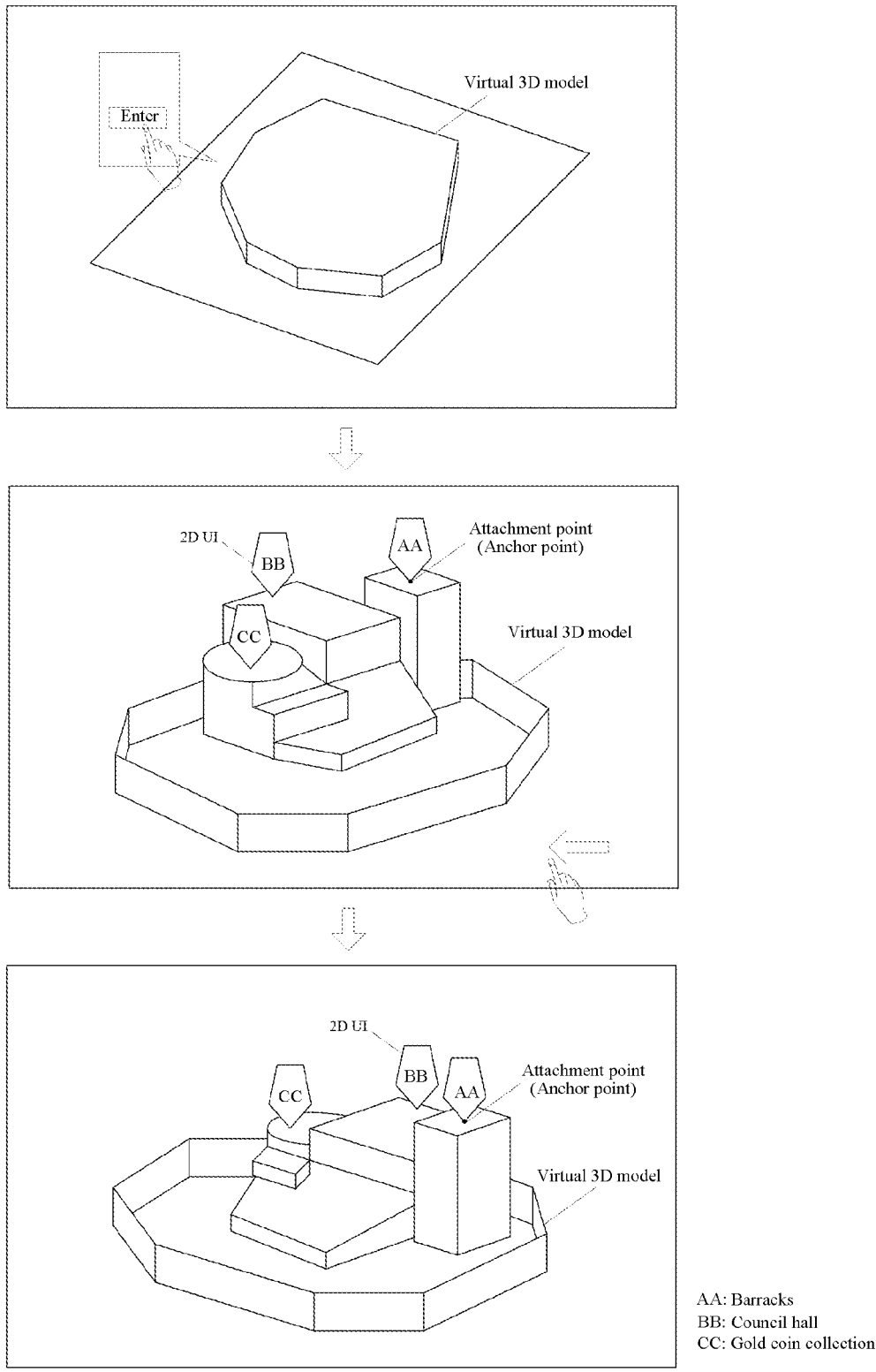
FIG. 5 is a schematic diagram of a process of controlling game display according to an embodiment of the present disclosure.

FIG. 5 is a schematic diagram of a process of controlling game display according to some embodiments of the present disclosure. As shown in FIG. 5, when the graphical user interface includes a virtual 3D model, by performing a click operation on the virtual 3D model, an "Enter" control is popped up, so that game players can confirm whether to enter the 2D UI control display interface. When the game player clicks the "Enter" control, the default viewing angle of the virtual camera for shooting the virtual 3D model can be determined. Under the default viewing angle of the virtual camera for shooting the virtual 3D model, a 2D UI control will be displayed in the graphical user interface according to the anchor point coordinate of the 2D UI control in the screen space, such as: a 2D UI control for barracks, a 2D UI control for council hall, a 2D UI Control for gold coin collection, etc. By performing a left sliding (dragging) operation on the graphical user interface, the default viewing angle of the virtual camera for shooting the virtual 3D model can be adjusted to the current viewing angle and the coordinate of the attachment point in the camera space of the virtual camera can be updated. The default viewing angle corresponds to the starting position of the sliding (dragging) operation. The current viewing angle corresponds to the end position of the sliding (dragging) operation. Taking the 2D UI control for barracks as an example, the anchor point of the 2D UI control for barracks is the bottom vertex of the pentagon, and the position of the coordinate of the anchor point coincides with the position of the coordinate of the attachment point in the screen space. Therefore, the coordinate of the attachment point in the screen space can be determined first according to the updated coordinate of the attachment point in the camera space, then the anchor point coordinate in the screen space of the anchor point of the 2D UI control for barracks can be determined according to the coordinate of the attachment point in the screen space, and then the 2D UI control for barracks is displayed in the graphical user interface according to the anchor point coordinate.

In some embodiments, in step S41, updating the first coordinate of the attachment point in the camera space of the virtual camera may include the following execution steps:

In step S411, a coordinate offset of the attachment point in the camera space is determined according to a viewing angle variation difference between the default viewing angle and the current viewing angle;

In step S412, the first coordinate of the attachment point in the camera space of the virtual camera is updated according to the coordinate offset.

By performing a sliding (dragging) operation on the graphical user interface, the default viewing angle of the virtual camera for shooting the three-dimensional game scene can be adjusted to the current viewing angle. At this time, it is required to determine the coordinate offset of the attachment point adjusted from the default viewing angle to the current viewing angle in the camera space according to the viewing angle variation difference between the default viewing angle and the current viewing angle, so as to update the first coordinate of the attachment point in the camera space of the virtual camera according to the coordinate offset. For example: under the default viewing angle of the virtual camera for shooting the three-dimensional game scene, the representation of the three coordinate axes of the camera space in the world space can be calculated, and then by constructing a transformation matrix from the camera space to the world space, and then inverting the transformation matrix to obtain a transformation matrix from the world space to the camera space, the first coordinate of the attachment point in the camera space of the virtual camera is determined as (X1, Y1, Z1). Under the current viewing angle of the virtual camera for shooting the three-dimensional game scene, the representation of the three coordinate axes of the camera space in the world space can be calculated, and by constructing a transformation matrix from the camera space to the world space and inverting the transformation matrix to obtain a transformation matrix from the world space to the camera space, thus the first coordinate of the attachment point in the camera space of the virtual camera can be determined as (X2, Y2, Z2). Then, based on (X1, YT, Z1) and (X2, Y2, Z2), it can be determined that the viewing angle variation difference between the default viewing angle and the current viewing angle is the angle A. Then, the coordinate offset F of the attachment point in the camera space is determined using the angle A through the mapping relationship between the preset viewing angle variation difference and the coordinate offset. Finally, according to the coordinate offset F, the first coordinate of the attachment point in the camera space of the virtual camera is updated to be (X3, Y3, Z3).

From the description of the above embodiments, those skilled in the art can clearly understand that the method according to the above embodiments can be implemented by means of software plus a necessary general hardware platform, and can also be implemented by hardware, but in many cases the former is better implementation. Based on this understanding, the technical solutions of the present disclosure essentially or the parts that make contributions to the related art can be embodied in the form of a software product, and the computer software product is stored in a storage medium (such as ROM/RAM, magnetic disk, CD-ROM), including several instructions to enable a terminal device (such as a mobile phone, a computer, a server, or a network device, etc.) to execute the method described in the various embodiments of the present disclosure.

In the embodiment, a device for controlling game display is also provided, and the device is configured to implement the above-mentioned embodiments and implementations, which has been described and is not be repeated. As used below, the term "module" may be a combination of software and/or hardware that implements a predetermined function. Although the device described in the following embodiments is preferably implemented in software, implementations in hardware, or a combination of software and hardware, are also possible and contemplated.

Figure 6:
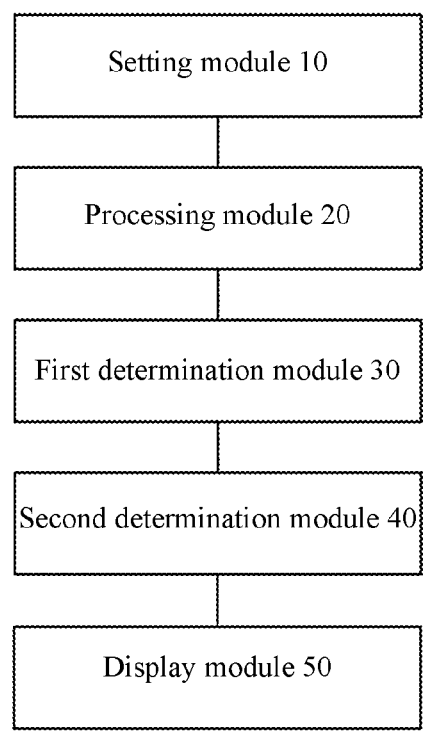
FIG. 6 is a structural block diagram of a device for controlling game display according to an embodiment of the present disclosure.

FIG. 6 is a structural block diagram of device for controlling game display according to one embodiment of the present disclosure, a graphical user interface is provided by an electronic device, and the content displayed on the graphical user interface includes a game scene image obtained by shooting a three-dimensional game scene with a virtual camera, where the game scene image includes a target virtual three-dimensional model. As shown in FIG. 6, the device includes: a setting module 10, configured to provide an attachment point on the target virtual three-dimensional model; a processing module 20, configured to adjust a default viewing angle for shooting the three-dimensional game scene with the virtual camera to a current viewing angle in response to a first touch operation on the graphical user interface, and update a first coordinate of the attachment point in a camera space of the virtual camera; a first determining module 30, configured to determine a second coordinate of the attachment point in a screen space according to the updated first coordinate of the attachment point in the camera space; the second determination module 40, configured to determine an anchor point coordinate in the screen space of an anchor point of a two-dimensional UI control associated with the target virtual three-dimensional model according to the second coordinate of the attachment point in the screen space; a display module 50, configured to display the two-dimensional UI control in the graphical user interface according to the anchor point coordinate.

In some embodiments, the processing module 20 is configured to adjust a default viewing angle for shooting the target virtual three-dimensional model with the virtual camera to the current viewing angle in response to the first touch operation on the graphical user interface.

In some embodiments, the processing module 20 is further configured to, in response to a second touch operation on the graphical user interface, adjust a first image content obtained by shooting the three-dimensional game scene with the virtual camera to a second image content; and, when the second image content includes the target virtual three-dimensional model, in response to a third touch operation on the target virtual three-dimensional model, determine the default viewing angle for shooting the target virtual three-dimensional model with the virtual camera is determined.

In some embodiments, the two-dimensional UI control is a two-dimensional map generated based on a preset two-dimensional UI template, the preset two-dimensional UI template is configured in a two-dimensional UI editor, the preset two-dimensional UI template is used to determine style of the two-dimensional UI control, and display content of the two-dimensional UI control includes at least one of the following: a picture identification and a text identification.

In some embodiments, the processing module 20 is configured to determine a coordinate offset of the attachment point in the camera space according to a viewing angle variation difference between the default viewing angle and the current viewing angle; and update the first coordinate of the attachment point in the camera space of the virtual camera according to the coordinate offset.

In some embodiments, the processing module 20 is configured to adjust the default viewing angle for shooting the three-dimensional game scene with the virtual camera to the current viewing angle within a viewing angle variation range of the virtual camera, where the viewing angle variation range is used to define an upper limit value of viewing angle variation and a lower limit value of viewing angle variation value of the current viewing angle relative to the default viewing angle.

In some embodiments, the anchor point coordinate is any vertex coordinate or center coordinate of the two-dimensional UI control.

It should be noted that the above modules can be implemented by software or hardware, and the latter can be implemented in the following ways, but not limited to this: the above modules are all located in a same processor; or the above modules can be are located in different processors in any combination forms.

Embodiments of the present disclosure also provide a non-transitory computer-readable storage medium, where a computer program is stored in the non-transitory computer-readable storage medium, the computer program is configured to, when run, execute steps of any of the above method embodiments.

In some embodiments, the above-mentioned non-transitory computer-readable storage medium may be configured to store a computer program for executing the following steps:

In S1, an attachment point is provided on the target virtual three-dimensional model;

In S2, in response to a first touch operation on the graphical user interface, a default viewing angle for shooting the three-dimensional game scene with the virtual camera is adjusted to a current viewing angle, and a first coordinate of the attachment point in the camera space of the virtual camera is updated;

In S3, according to the updated first coordinate of the attachment point in the camera space, a second coordinate of the attachment point in the screen space is determined;

In S4, according to the second coordinate of the attachment point in the screen space, an anchor point coordinate in the screen space of an anchor point of a two-dimensional UI control associated with the target virtual three-dimensional model is determined 1;

In S5, the two-dimensional UI control is displayed in the graphical user interface according to the anchor point coordinate.

In some embodiments, the adjusting the default viewing angle for shooting the three-dimensional game scene with the virtual camera to the current viewing angle includes: adjusting a default viewing angle for shooting the target virtual three-dimensional model with the virtual camera to the current viewing angle.

In some embodiments, the computer program is further for executing the following steps: adjusting, in response to a second touch operation on the graphical user interface, a first image content obtained by shooting the three-dimensional game scene with the virtual camera to a second image content; and determining, in response to a third touch operation on the target virtual three-dimensional model and in response to determining that the second image content includes the target virtual three-dimensional model, the default viewing angle for shooting the target virtual three-dimensional model with the virtual camera.

In some embodiments, the two-dimensional UI control is a two-dimensional map generated based on a preset two-dimensional UI template, the preset two-dimensional UI template is configured in a two-dimensional UI editor, the preset two-dimensional UI template is used to determine style of the two-dimensional UI control, and display content of the two-dimensional UI control includes at least one of the following: a picture identification and a text identification.

In some embodiments, the updating the first coordinate of the attachment point in the camera space of the virtual camera includes: determining a coordinate offset of the attachment point in the camera space according to a viewing angle variation difference between the default viewing angle and the current viewing angle; and updating the first coordinate of the attachment point in the camera space of the virtual camera according to the coordinate offset.

In some embodiments, the adjusting the default viewing angle for shooting the three-dimensional game scene with the virtual camera to the current viewing angle includes: adjusting the default viewing angle for shooting the three-dimensional game scene with the virtual camera to the current viewing angle within a viewing angle variation range of the virtual camera, where the viewing angle variation range is used to define an upper limit value of viewing angle variation and a lower limit value of viewing angle variation of the current viewing angle relative to the default viewing angle.

In some embodiments, the anchor point coordinate is a vertex coordinate or a center coordinate of the two-dimensional UI control.

Through the above steps, the effect of a 3D UI control can be simulated using a 2D UI control in the virtual 3D model in the game scene, so that when adjusting the viewing angle of the virtual camera to shoot the three-dimensional game scene, the 2D UI control can visually follow the movement, thus realizing the technique effects of reducing the system power consumption effectively and enhancing the game screen expressiveness on the premise of ensuring the operating efficiency of the electronic device, furthermore solving the technical problem of lack of interface effect expressiveness in the processing method of combining the 2D UI control with the background image provided in the related art, and the technical problem of increasing the system power consumption of the mobile terminal in the processing method of combing the virtual 3D model with the 3D UI control.

In some embodiments, the above-mentioned non-transitory computer-readable storage medium may include but is not limited to: U disk, read-only memory (referred to as ROM), random access memory (referred to as RAM), various medium for storing computer programs, such as mobile hard disk, magnetic disk or optical disk.

Embodiments of the present disclosure also provides an electronic device, including a memory and a processor, where a computer program is stored in the memory, and the processor is configured to run the computer program to execute the steps in any one of the above method embodiments.

In some embodiments, the above-mentioned electronic device may further include a transmission device and an input-output device, where the transmission device is connected to the above-mentioned processor, and the input-output device is connected to the above-mentioned processor.

In some embodiments, the above-mentioned processor may be configured to execute the following steps through a computer program:

In S1, an attachment point is provided on the target virtual three-dimensional model;

In S2, in response to a first touch operation on the graphical user interface, a default viewing angle for shooting the three-dimensional game scene with the virtual camera is adjusted to a current viewing angle, and a first coordinate of the attachment point in the camera space of the virtual camera is updated;

In S3, according to the updated first coordinate of the attachment point in the camera space, a second coordinate of the attachment point in the screen space is determined;

In S4, according to the second coordinate of the attachment point in the screen space, an anchor point coordinate in the screen space of an anchor point of a two-dimensional UI control associated with the target virtual three-dimensional model is determined 1;

In S5, the two-dimensional UI control is displayed in the graphical user interface according to the anchor point coordinate.

In some embodiments, the adjusting the default viewing angle for shooting the three-dimensional game scene with the virtual camera to the current viewing angle includes: adjusting a default viewing angle for shooting the target virtual three-dimensional model with the virtual camera to the current viewing angle.

In some embodiments, the processor may be further configured to execute the following steps through the computer program: adjusting, in response to a second touch operation on the graphical user interface, a first image content obtained by shooting the three-dimensional game scene with the virtual camera to a second image content; and determining, in response to a third touch operation on the target virtual three-dimensional model and in response to determining that the second image content includes the target virtual three-dimensional model, the default viewing angle for shooting the target virtual three-dimensional model with the virtual camera.

In some embodiments, the two-dimensional UI control is a two-dimensional map generated based on a preset two-dimensional UI template, the preset two-dimensional UI template is configured in a two-dimensional UI editor, the preset two-dimensional UI template is used to determine style of the two-dimensional UI control, and display content of the two-dimensional UI control includes at least one of the following: a picture identification and a text identification.

In some embodiments, the updating the first coordinate of the attachment point in the camera space of the virtual camera includes: determining a coordinate offset of the attachment point in the camera space according to a viewing angle variation difference between the default viewing angle and the current viewing angle; and updating the first coordinate of the attachment point in the camera space of the virtual camera according to the coordinate offset.

In some embodiments, the adjusting the default viewing angle for shooting the three-dimensional game scene with the virtual camera to the current viewing angle includes: adjusting the default viewing angle for shooting the three-dimensional game scene with the virtual camera to the current viewing angle within a viewing angle variation range of the virtual camera, where the viewing angle variation range is used to define an upper limit value of viewing angle variation and a lower limit value of viewing angle variation of the current viewing angle relative to the default viewing angle.

In some embodiments, the anchor point coordinate is a vertex coordinate or a center coordinate of the two-dimensional UI control.

Through the above steps, the effect of a 3D UI control can be simulated using a 2D UI control in the virtual 3D model in the game scene, so that when adjusting the viewing angle of the virtual camera to shoot the three-dimensional game scene, the 2D UI control can visually follow the movement, thus realizing the technique effects of reducing the system power consumption effectively and enhancing the game screen expressiveness on the premise of ensuring the operating efficiency of the electronic device, furthermore solving the technical problem of lack of interface effect expressiveness in the processing method of combining the 2D UI control with the background image provided in the related art, and the technical problem of increasing the system power consumption of the mobile terminal in the processing method of combing the virtual 3D model with the 3D UI control.

For specific examples in the embodiment, reference may be made to the examples described in the foregoing embodiments and optional implementation manners, and details are not described here again in the embodiment.

The above-mentioned serial numbers of the embodiments of the present disclosure are for description, and do not represent the advantages or disadvantages of the embodiments.

In the above-mentioned embodiments of the present disclosure, the description of each embodiment has its own emphasis. For parts that are not described in detail in a certain embodiment, reference may be made to related descriptions of other embodiments.

In the several embodiments provided in the present disclosure, it should be understood that the disclosed technical content can be implemented in other ways. Among them, the device embodiments described above are illustrative, for example, the division of the units may be a logical function division, and there may be other division methods in actual implementation, for example, multiple units or components may be combined or integrated into another system, or some features can be ignored, or not implemented. On the other hand, the shown or discussed mutual coupling or direct coupling or communication connection may be through some interfaces, indirect coupling or communication connection of units or modules may be in electrical or other forms.

The units described as separate components may or may not be physically separated, and components shown as units may or may not be physical units, that is, may be located in one place, or may be distributed to multiple units. Some or all of the units may be selected according to actual needs to achieve the purpose of the solution in the embodiments.

In addition, each functional unit in each embodiment of the present disclosure may be integrated into one processing unit, or each unit may exist physically alone, or two or more units may be integrated into one unit. The above-mentioned integrated units may be implemented in the form of hardware, or may be implemented in the form of software functional units.

The integrated unit, if implemented in the form of a software functional unit and sold or used as an independent product, may be stored in a computer-readable storage medium. Based on the understanding, the technical solutions of the present disclosure, or the part that contributes to the related art, or all or part of the technical solutions can be embodied in the form of software products in essence, and the computer software product is stored in a storage medium, including several instructions to enable a computer device (such as a personal computer, a server, or a network device, etc.) to execute all or part of the steps of the method described in the various embodiments of the present disclosure. The aforementioned storage medium includes: U disk, read-only memory (ROM), random access memory (RAM), mobile hard disk, magnetic disk or optical disk and other medium that can store program codes.

The above are embodiments of the present disclosure. It should be pointed out that for those skilled in the art, without departing from the principles of the present disclosure, several improvements and modifications can be made, which should be regarded within the protection scope of the present disclosure.

What is claimed is:

1. A method for controlling game display, comprising:
    providing, by an electronic device comprising a graphical user interface, an attachment point on a target virtual three-dimensional model in a game scene image, wherein content displayed on the graphical user interface comprises the game scene image obtained by shooting a three-dimensional game scene with a virtual camera, and the game scene image comprises the target virtual three-dimensional model;
    adjusting, in response to a first touch operation on the graphical user interface, a default viewing angle for shooting the three-dimensional game scene with the virtual camera to a current viewing angle, and updating a first coordinate of the attachment point in a camera space of the virtual camera;
    determining a second coordinate of the attachment point in a screen space according to the first coordinate of the attachment point in the camera space;
    determining an anchor point coordinate in the screen space of an anchor point of a two-dimensional user interface (UI) control associated with the target virtual three-dimensional model according to the second coordinate of the attachment point in the screen space; and
    displaying the two-dimensional UI control in the graphical user interface according to the anchor point coordinate.

2. The method for controlling game display according to claim 1, wherein adjusting the default viewing angle for shooting the three-dimensional game scene with the virtual camera to the current viewing angle comprises:
    adjusting a default viewing angle for shooting the target virtual three-dimensional model with the virtual camera to the current viewing angle.

3. The method for controlling game display according to claim 1, wherein the method for controlling game display further comprises:
    adjusting, in response to a second touch operation on the graphical user interface, a first image content obtained by shooting the three-dimensional game scene with the virtual camera to a second image content; and
    in response to a third touch operation on the target virtual three-dimensional model and in response to determining that the second image content comprises the target virtual three-dimensional model, determining the default viewing angle for shooting the target virtual three-dimensional model with the virtual camera.

4. The method for controlling game display according to claim 1, wherein the two-dimensional UI control comprises a two-dimensional map generated based on a preset two-dimensional UI template, the preset two-dimensional UI template is configured in a two-dimensional UI editor and is configured to determine style of the two-dimensional UI control, and display content of the two-dimensional UI control comprises at least one of a picture identification or a text identification.

5. The method for controlling game display according to claim 1, wherein updating the first coordinate of the attachment point in the camera space of the virtual camera comprises:
    determining a coordinate offset of the attachment point in the camera space according to a viewing angle variation difference between the default viewing angle and the current viewing angle; and
    updating the first coordinate of the attachment point in the camera space of the virtual camera according to the coordinate offset.

6. The method for controlling game display according to claim 1, wherein adjusting the default viewing angle for shooting the three-dimensional game scene with the virtual camera to the current viewing angle comprises:
    adjusting the default viewing angle for shooting the three-dimensional game scene with the virtual camera to the current viewing angle within a viewing angle variation range of the virtual camera, wherein the viewing angle variation range defines an upper limit value of viewing angle variation and a lower limit value of viewing angle variation of the current viewing angle relative to the default viewing angle.

7. The method for controlling game display according to claim 1, wherein the anchor point coordinate is a vertex coordinate or a center coordinate of the two-dimensional UI control.

8. A non-transitory computer-readable storage medium, wherein a computer program stored in the storage medium, and the computer program is configured to, when run, execute following steps:
    providing an attachment point on a target virtual three-dimensional model in a game scene image, wherein content displayed on a graphical user interface comprises the game scene image obtained by shooting a three-dimensional game scene with a virtual camera, and the game scene image comprises the target virtual three-dimensional model;

adjusting, in response to a first touch operation on the graphical user interface, a default viewing angle for shooting the three-dimensional game scene with the virtual camera to a current viewing angle, and updating a first coordinate of the attachment point in a camera space of the virtual camera;

determining a second coordinate of the attachment point in a screen space according to the first coordinate of the attachment point in the camera space;

determining an anchor point coordinate in the screen space of an anchor point of a two-dimensional user interface (UI) control associated with the target virtual three-dimensional model according to the second coordinate of the attachment point in the screen space; and displaying the two-dimensional UI control in the graphical user interface according to the anchor point coordinate.

9. An electronic device comprising a memory and a processor, wherein a computer program is stored in the memory, and the processor is configured to run the computer program to execute following steps:

providing an attachment point on a target virtual three-dimensional model in a game scene image, wherein the electronic device comprises a graphical user interface, content displayed on the graphical user interface comprises the game scene image obtained by shooting a three-dimensional game scene with a virtual camera, and the game scene image comprises the target virtual three-dimensional model;

adjusting, in response to a first touch operation on the graphical user interface, a default viewing angle for shooting the three-dimensional game scene with the virtual camera to a current viewing angle, and updating a first coordinate of the attachment point in a camera space of the virtual camera;

determining a second coordinate of the attachment point in a screen space according to the first coordinate of the attachment point in the camera space;

determining an anchor point coordinate in the screen space of an anchor point of a two-dimensional user interface (UI) control associated with the target virtual three-dimensional model according to the second coordinate of the attachment point in the screen space; and displaying the two-dimensional UI control in the graphical user interface according to the anchor point coordinate.

10. The method for controlling game display according to claim 1, wherein the target virtual three-dimensional model comprises at least one of:

a virtual three-dimensional building model, a virtual three-dimensional vehicle model, or a virtual three-dimensional natural resource model.

11. The method for controlling game display according to claim 4, wherein the style of the two-dimensional UI control comprises at least one of: an outline of the 2D UI control, a color of the 2D UI control, or a transparency of the 2D UI control.

12. The method for controlling game display according to claim 3, wherein the method for controlling game display further comprises:

in response to the second touch operation, displaying both the first image content and the second image content with a first scale; and displaying both the game scene image obtained by shooting the three-dimensional game scene with the virtual camera at the default viewing angle in response to the third touch operation and the game scene image obtained by shooting the three-dimensional game scene with the virtual camera at the current viewing angle in response to the first touch operation with a second scale;

wherein, the second scale is larger than the first scale.

13. The non-transitory computer-readable storage medium according to claim 8, wherein adjusting the default viewing angle for shooting the three-dimensional game scene with the virtual camera to the current viewing angle comprises:

adjusting a default viewing angle for shooting the target virtual three-dimensional model with the virtual camera to the current viewing angle.

14. The non-transitory computer-readable storage medium according to claim 8, wherein the computer program is further configured to execute following steps:

adjusting, in response to a second touch operation on the graphical user interface, a first image content obtained by shooting the three-dimensional game scene with the virtual camera to a second image content; and in response to a third touch operation on the target virtual three-dimensional model and in response to determining that the second image content comprises the target virtual three-dimensional model, determining the default viewing angle for shooting the target virtual three-dimensional model with the virtual camera.

15. The non-transitory computer-readable storage medium according to claim 8, wherein two-dimensional UI control comprises a two-dimensional map generated based on a preset two-dimensional UI template, the preset two-dimensional UI template is configured in a two-dimensional UI editor and used to determine style of the two-dimensional UI control, and display content of the two-dimensional UI control comprises at least one of a picture identification or a text identification.

16. The non-transitory computer-readable storage medium according to claim 8, wherein updating the first coordinate of the attachment point in the camera space of the virtual camera comprises:

determining a coordinate offset of the attachment point in the camera space according to a viewing angle variation difference between the default viewing angle and the current viewing angle; and updating the first coordinate of the attachment point in the camera space of the virtual camera according to the coordinate offset.

17. The electronic device according to claim 9, wherein adjusting the default viewing angle for shooting the three-dimensional game scene with the virtual camera to the current viewing angle comprises:

adjusting a default viewing angle for shooting the target virtual three-dimensional model with the virtual camera to the current viewing angle.

18. The electronic device according to claim 9, wherein the processor is further configured to run the computer program to execute following steps:

adjusting, in response to a second touch operation on the graphical user interface, a first image content obtained by shooting the three-dimensional game scene with the virtual camera to a second image content; and in response to a third touch operation on the target virtual three-dimensional model and in response to determining that the second image content comprises the target virtual three-dimensional model, determining the default viewing angle for shooting the target virtual three-dimensional model with the virtual camera.

19. The electronic device according to claim 9, wherein two-dimensional UI control comprises a two-dimensional map generated based on a preset two-dimensional UI template, the preset two-dimensional UI template is configured in a two-dimensional UI editor and used to determine style of the two-dimensional UI control, and display content of the two-dimensional UI control comprises at least one of a picture identification or a text identification.

20. The electronic device according to claim 9, wherein updating the first coordinate of the attachment point in the camera space of the virtual camera comprises:
   determining a coordinate offset of the attachment point in the camera space according to a viewing angle variation difference between the default viewing angle and the current viewing angle; and
   updating the first coordinate of the attachment point in the camera space of the virtual camera according to the coordinate offset.

* * * * *